United States Patent [19]

Mazzini

[11] 3,946,702
[45] Mar. 30, 1976

[54] AUTOMATIC ANIMAL FEEDERS

[76] Inventor: Anthony E. Mazzini, 437 W. Roscoe St., Chicago, Ill. 60657

[22] Filed: Nov. 18, 1974

[21] Appl. No.: 524,346

[52] U.S. Cl. .............................................. 119/51.13
[51] Int. Cl.² .......................................... A01K 5/02
[58] Field of Search............ 119/51.13, 51.11, 51.12, 119/51.5

[56] References Cited
UNITED STATES PATENTS

| | | | |
|---|---|---|---|
| 2,528,742 | 11/1950 | Coffing | 119/51.12 |
| 3,196,835 | 7/1965 | Bergevin | 119/51.11 |
| 3,741,162 | 6/1973 | Lopez | 119/51.13 |

Primary Examiner—Hugh R. Chamblee

[57] ABSTRACT

An automatic animal feeder comprising a housing in which a food container is rotatable. The food container has circularly-spaced food compartments which register in consecutive order with a food outlet below when the food container receives periodical motion. An electric time clock actuates a facility in the lower part of the housing to emit a loud whistle and advance the compartments to register as stated at timed intervals.

8 Claims, 5 Drawing Figures

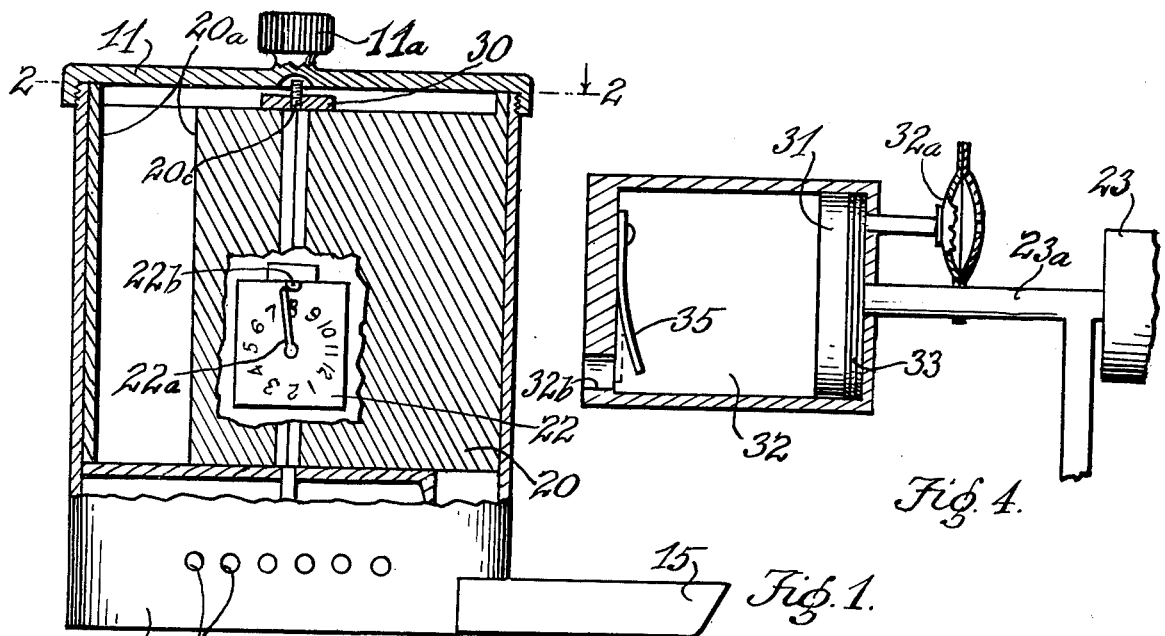
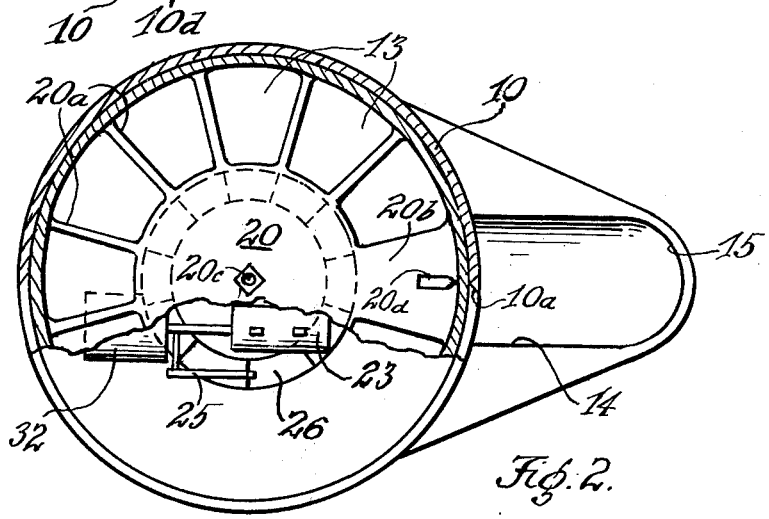
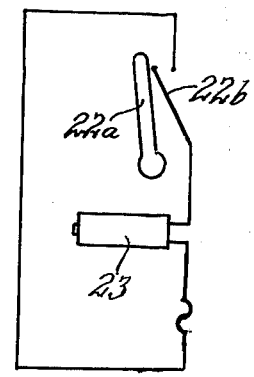
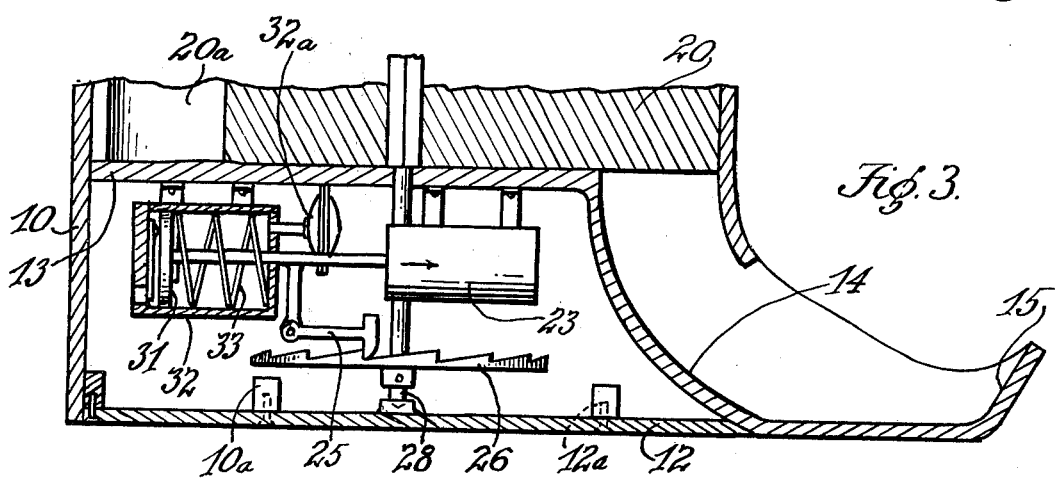

AUTOMATIC ANIMAL FEEDERS

This invention relates to apparatus designed to dispense portions of animal food periodically and automatically. This subject is of particular importance in the care of dogs, which are often left for several days in the care of children or persons who do not have the time or patience to feed a dog at regular or prescribed intervals. It is therefore one object of the present invention to provide a feeder in which the food is distributed in portions designed to be dispensed at regular intervals for an extended period, and having a mechanism which operates the food dispensing facility automatically.

A further object is to design the feeder with a food container which receives rotary impulses at intervals, the container having a series of food-receiving compartments which stop in sequence to communicate with a food discharging and serving facility.

A still further object is to include a mechanism which translates a fast electrical control into the very slow advance of a food container for maintaining uniformity in the food dispensing action.

Another object is to construct the dispensing mechanism with a whistle which blows loudly at each feeding period, in order to summon the animal in case it is in another room or at a point distant from the feeder.

A final object is to design the feeder along simple lines and so portable that it may be readily moved to any convenient location.

A better understanding of the invention may be gained by reference to the accompanying drawing, in which FIG. 1 is a vertical section of the feeder, with frontal portions in elevation;

FIG. 2 is a section on the line 2—2 of FIG. 1;

FIG. 3 is a vertical section of the lower portion of the feeder, on a larger scale;

FIG. 4 is an enlarged duplication of a mechanism in the left-center of FIG. 3, in a changed position; and FIG. 5 is a diagram of an electrical circuit employed in the feeder.

Referring specifically to the drawing, 10 denotes the housing of the feeder, which is tubular and open at the top and bottom. At the top it is threaded to receive a lid 11 formed with a hand knob 11a, as seen in FIG. 1. At the bottom the housing has inward lugs 10a receiving a base 12 on the under side, the lugs being tapped for receiving screws 12a to secure the base. The housing also has a floor 13 in the lower part which combines with the wall of the housing to form a dispensing chute 14 leading into a food serving tray 15.

The removal of the lid 11 reveals the food container of the feeder. It is preferably in the form of an earthenware block 20 of cylindrical form to fit slidably in the housing, and glazed on all surfaces for easy cleaning and to reduce friction when rotated. The block is made with a series of vertical compartments 20a along its periphery which include a solid portion 20b. The food compartments are open at the top and bottom; and the block 20 rests on the floor 13 when deposited in the housing 10, as shown in FIGS. 1 and 3.

When the block 20 is given periodical rotation, the food compartments 20a register in turn with the chute 14. Before the feeder is put into use the block is set with the solid portion 20b over the chute 14 as seen in FIG. 2, this barring communication between the food container and the chute. Now all the food compartments have the floor 13 as their bottom. Food, which usually comes in chunks or loose material, may thus be deposited in the food compartments; and these may be emptied consecutively into the chute 14 after the solid portion 20b has departed from registration with the chute.

The periodical delivery of food portions to the chute 14 is induced automatically by an electric time clock 22 connected to a handy service outlet. The time clock is mounted on the outside of the housing, as seen in FIG. 1, and is designed to operate a solenoid 23 in the bottom of the housing. Usually a house pet is fed twice a day; and FIG. 5 shows a simple circuit of the solenoid where the hour hand 22a of the time clock closes a switch 22b momentarily every 12 hours. A button type is shown.

According to FIG. 3, the stroke of the solenoid — per arrow in the center of FIG. 3 — creates an idle impulse by causing a pawl 25 to slip a tooth of a horizontal ratchet wheel 26 in the bottom of the housing. The ratchet wheel is carried by a vertical shaft 28 rising in square form through the block 20 to terminate with a screw 20c; and a nut 30 serves as a retainer for the block. The rotary intervals of the ratchet wheel correspond to those of the food compartments; and the position of the food container is not altered by the aforesaid slip of the pawl 25.

The solenoid rod 23a is extended with a plunger 31 in a cylinder 32, which compresses a spring 33 on the power stroke of the solenoid. Thus, when the switch 22b is again open, the spring returns the solenoid rod and causes the pawl 25 to draw the ratchet wheel 26 through a step accomplishing a food delivery from the food container. As to the cylinder 32, it has a whistle outlet 32a at one end operated during the fast idling stroke of the pawl as a loud signal to the animal of feeding time, and a vent 32b at the other end. The vent is covered by a spring flap 35 which recedes as seen in FIG, 4 on the fast power stroke of the solenoid, but closes almost fully on the return of the plunger from the expansion of the spring 33. Such return is therefore slow; and it imparts a slow rotary stroke to the food container. It is now obvious that the solenoid actuation is preferable to a motor because of cost, and that with the very slow ratchet wheel feed and the block quite heavy, it will receive no momentum to overrun its rotary advances and throw the food compartments out of individual registration with the chute 14. In this respect the food container is preferably made with an index 20d on the solid portion 20b in relation to a center point 10a on the housing to indicate the proper position of the food container before it receives food portions in its compartments. Further, with the whistle operated by the fast action of the plunger 31, it should emit a sound so loud as to be heard by the animal when in a different room or outdoors; and the side of the housing is made with holes 10d — as seen in the bottom of FIG. 1 — for the sound of the whistle to issue from the housing.

It is now apparent that one phase of the care necessary for house pets — particularly dogs — is accomplished by the present invention by relieving occupants of the premises of concern about the proper feeding of the animal during an absence of several days by its owner. With most animal foods dry and easy flowing, the operation of the feeder should be satisfactory and reliable after it is set properly and filled.

I claim:

1. An animal feeder comprising a housing, a food container rotatable therein and formed with circularly-spaced food compartments, a food-dispensing outlet in the lower part of the housing, the food compartments being adapted to register consecutively with the outlet on the periodical rotation of the food container, an automatic timer, and a motive unit positioned below said container and activated by said timer to rotate the food container at the intervals controlled by the timer, said motive unit comprising rotatable ratchet means attached to said container, piston means include a pawl to move said rotatable means and electrical means to activate said piston means in response to said timer.

2. The structure of claim 1 further comprising means operatively connected to said piston means to emit an audible signal on the operation of the said piston means.

3. The structure of claim 2, wherein said piston means is operative at high speed in one direction by the said electrical means thereby to emit said signal and at low speed in the opposite direction to move the rotatable means to rotate the food container.

4. The structure of claim 1, wherein said said ratchet means is a wheel formed with teeth arranged as the food compartments, said pawl on said piston means is moved at high speed in one direction by said piston means to engage a ratchet wheel tooth, said piston means moving the pawl in the opposite direction to rotate the ratchet wheel at low speed a distance equal to the length of one of said teeth.

5. The structure of claim 1, wherein said timer is connected to said electrical means, the latter comprising a solenoid, a circuit including same and a timer-controlled switch, the latter operating at said intervals to activate the solenoid to move the piston means in the high speed direction, said piston means being connected to said solenoid.

6. The structure of claim 5, said piston means comprising an air cylinder, a plunger in the latter with an exterior arm dependently extended from said plunger to pivotally mount the pawl, a spring in the cylinder compressed by the movement of the plunger toward one end of the cylinder in the high speed direction by the action of said solenoid and effective to return the plunger toward the other end of the cylinder, a limited air outlet at such other end to slacken the speed of return of the plunger, the movement of said plunger toward said one end exhausting the air in said cylinder thereby activating an audible signal means.

7. The structure of claim 6, said limited air outlet being a check valve in the other end of the cylinder, said audible signal means being a whistle device.

8. An animal feeder comprising a housing, a food container rotatable therein and formed with circularly-spaced food compartments, a food-dispensing outlet in the lower part of the housing, the food compartments being adapted to register consecutively with the outlet on the periodical rotation of the food container, an automatic timer, and a motive unit positioned below said container and activated by said timer to rotate the food container at the intervals controlled by the timer; said motive unit comprising rotatable ratchet means attached to said container, piston means including a pawl to move said rotatable means and electrical means to activate said piston means in response to said timer; said timer being connected to said electrical means, the latter comprising a solenoid, a circuit including same and a timer-controlled switch, the latter operating at said intervals to activate the solenoid to move the pawl on said piston means at high speed in one direction to engage said ratchet means, said piston means moving the pawl in the opposite direction at low speed for a predetermined distance, said piston means being connected to said solenoid; said piston means comprising an air cylinder, a plunger in the latter with an exterior arm dependently extended from said plunger to pivotally mount the pawl, a spring in the cylinder compressed by the movement of the plunger toward one end of the cylinder in the high speed direction and effective to return the plunger toward the other end of the cylinder, a limited air outlet at such other end to slacken the speed of return of the plunger and cause the the ratchet means to be rotated as stated, and a whistle at the said one end of the cylinder operable when the plunger moves theretoward.

* * * * *